US012400626B2

(12) United States Patent
Kim et al.

(10) Patent No.: US 12,400,626 B2

(45) Date of Patent: Aug. 26, 2025

(54) SIGNAL PROCESSING DEVICE, STRINGED INSTRUMENT, SIGNAL PROCESSING METHOD, AND PROGRAM

(71) Applicant: Yamaha Corporation, Hamamatsu (JP)

(72) Inventors: Hidenari Kim, Hamamatsu (JP); Michael Wilson, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 811 days.

(21) Appl. No.: 17/643,950

(22) Filed: Dec. 13, 2021

(65) Prior Publication Data

US 2022/0101820 A1 Mar. 31, 2022

Related U.S. Application Data

(63) Continuation of application No. PCT/JP2020/023420, filed on Jun. 15, 2020.

(30) Foreign Application Priority Data

Jun. 24, 2019 (JP) ................................ 2019-116223

(51) Int. Cl.
*G10H 1/14* (2006.01)
*G10H 1/00* (2006.01)

(52) U.S. Cl.
CPC ............. *G10H 1/14* (2013.01); *G10H 1/0008* (2013.01)

(58) Field of Classification Search
CPC ............................... G10H 1/14; G10H 1/0008
USPC ............................................................ 84/622
See application file for complete search history.

(56) References Cited

U.S. PATENT DOCUMENTS

| | | | | |
|---|---|---|---|---|
| 6,111,186 | A * | 8/2000 | Krozack | G10H 3/186 84/736 |
| 2002/0005111 | A1* | 1/2002 | Ludwig | G10H 1/00 84/645 |
| 2011/0226118 | A1* | 9/2011 | Kuroki | G10H 3/186 84/735 |
| 2012/0294457 | A1* | 11/2012 | Chapman | H04R 3/00 381/98 |
| 2012/0294459 | A1* | 11/2012 | Chapman | G10H 3/186 381/98 |
| 2022/0101820 | A1* | 3/2022 | Kim | G10H 1/14 |

FOREIGN PATENT DOCUMENTS

| | | | | |
|---|---|---|---|---|
| CN | 102790932 | B * | 10/2015 | G10H 1/0091 |
| EP | 3 407 345 | A1 | 11/2018 | |
| JP | 2-162397 | A | 6/1990 | |
| JP | 2005-37759 | A | 2/2005 | |
| JP | 2005037759 | A * | 2/2005 | |
| JP | 2011-197325 | A | 10/2011 | |
| JP | 2014134756 | A * | 7/2014 | |

(Continued)

OTHER PUBLICATIONS

Japanese-language Office Action issued in Japanese Application No. 2021-528220 dated May 14, 2024 with English translation (6 pages).

(Continued)

*Primary Examiner* — Christina M Schreiber
(74) *Attorney, Agent, or Firm* — Crowell & Moring LLP

(57) ABSTRACT

A signal processing device acquires information relating to a stringed instrument, and sets a parameter to an equalizer based on the acquired information relating to the stringed instrument.

19 Claims, 8 Drawing Sheets

(56) References Cited

FOREIGN PATENT DOCUMENTS

| | | | | | |
|---|---|---|---|---|---|
| JP | 2017073631 | A | * | 4/2017 | |
| JP | 2020205564 | A | * | 12/2020 | |
| WO | WO-2012058497 | A1 | * | 5/2012 | ........... G10H 1/0083 |
| WO | WO-2017126281 | A1 | * | 7/2017 | ........... G10H 1/0091 |

OTHER PUBLICATIONS

International Search Report (PCT/ISA/210) issued in PCT Application No. PCT/JP2020/023420 dated Jul. 28, 2020 with English translation (five (5) pages).

Japanese-language Written Opinion (PCT/ISA/237) issued in PCT Application No. PCT/JP2020/023420 dated Jul. 28, 2020 (four (4) pages).

English translation of document C2 (Japanese-language Written Opinion (PCT/ISA/237), submitted on Dec. 13, 2021, issued in PCT Application No. PCT/JP2020/023420 dated Jul. 28, 2020 (four (4) pages).

English translation of Chinese-language Office Action issued in Chinese Application No. 202080044258.5 dated Jan. 14, 2025 (13 pages).

* cited by examiner

FIG. 2

| PRESSED STRING NUMBER | PRESSED FRET NUMBER | FREQUENCY | | | LEVEL ADJUSTMENT INFORMATION | | | • • • |
|---|---|---|---|---|---|---|---|---|
| | | FUNDAMENTAL TONE | 2ND HARMONIC | 3RD HARMONIC | FUNDAMENTAL TONE | 2ND HARMONIC | 3RD HARMONIC | |
| FIRST STRING | 0 | 330Hz | 660Hz | 990Hz | G101dB, WIDTH Q101 | G102dB, WIDTH Q102 | G103dB, WIDTH Q103 | • • • |
| | 1 | 349Hz | 698Hz | 1047Hz | G111dB, WIDTH Q111 | G112dB, WIDTH Q112 | G113dB, WIDTH Q113 | • • • |
| | 2 | 370Hz | 740Hz | 1110Hz | G121dB, WIDTH Q121 | G122dB, WIDTH Q122 | G123dB, WIDTH Q123 | • • • |
| | • • • | • • • | • • • | • • • | • • • | • • • | • • • | • • • |
| SECOND STRING | 0 | 247Hz | 494Hz | 741Hz | G201dB, WIDTH Q201 | G202dB, WIDTH Q202 | G203dB, WIDTH Q203 | • • • |
| | • • • | • • • | • • • | • • • | • • • | • • • | • • • | • • • |
| • • • | • • • | • • • | • • • | • • • | • • • | • • • | • • • | • • • |

SIGNAL PROCESSING DEVICE, STRINGED INSTRUMENT, SIGNAL PROCESSING METHOD, AND PROGRAM

CROSS-REFERENCE TO RELATED APPLICATIONS

The present application is a continuation application of International Application No. PCT/JP2020/023420, filed Jun. 15, 2020, which claims priority to Japanese Patent Application No. 2019-116223, filed Jun. 24, 2019. The contents of these applications are incorporated herein by reference.

BACKGROUND OF THE INVENTION

Field of the Invention

The present invention relates to a signal processing device, a stringed instrument, a signal processing method, and a program.

Description of Related Art

In recent years there has come to be known a signal processing device that uses an equalizer (EQ) to solve problems such as howling during a musical instrument performance (see, for example, PCT International Publication No. WO 2017/126281).

SUMMARY OF THE INVENTION

However, in the conventional signal processing device described above, the setting of the equalizer frequency and the like is fixed, making it necessary to perform the setting in advance. Further, in a conventional signal processing device, once a setting such as a frequency is set, it is difficult to change it dynamically during a performance.

The present invention has been made to solve the above problems. An example of an object of the present invention is to provide a signal processing device, a stringed instrument, a signal processing method, and a program capable of dynamically changing the setting of an equalizer according to a performance.

One aspect of the present invention is a signal processing device including: an acquisition unit that acquires information relating to a stringed instrument; and a setting unit that sets a parameter to an equalizer based on the acquired information relating to the stringed instrument.

Further, one aspect of the present invention is a stringed instrument including: the signal processing device described above; and a detector configured to detect the fingering information.

Further, one aspect of the present invention is a signal processing method is a signal processing method for a signal processing device including: acquiring information relating to a stringed instrument; and setting a parameter to an equalizer based on the acquired information relating to the stringed instrument.

Further, one aspect of the present invention is a non-transitory computer-readable recording medium that stores program code for causing a computer to execute: acquiring information relating to a stringed instrument; and setting a parameter to an equalizer based on the acquired information relating to the stringed instrument.

BRIEF DESCRIPTION OF THE DRAWINGS

FIG. 2 is a diagram showing a data example of a setting storage unit in the first embodiment.

EMBODIMENTS FOR CARRYING OUT THE INVENTION

Hereinbelow, a signal processing device, a stringed instrument, a signal processing method, and a program according to embodiments of the present invention will be described with reference to the drawings.

First Embodiment

Figure 1:
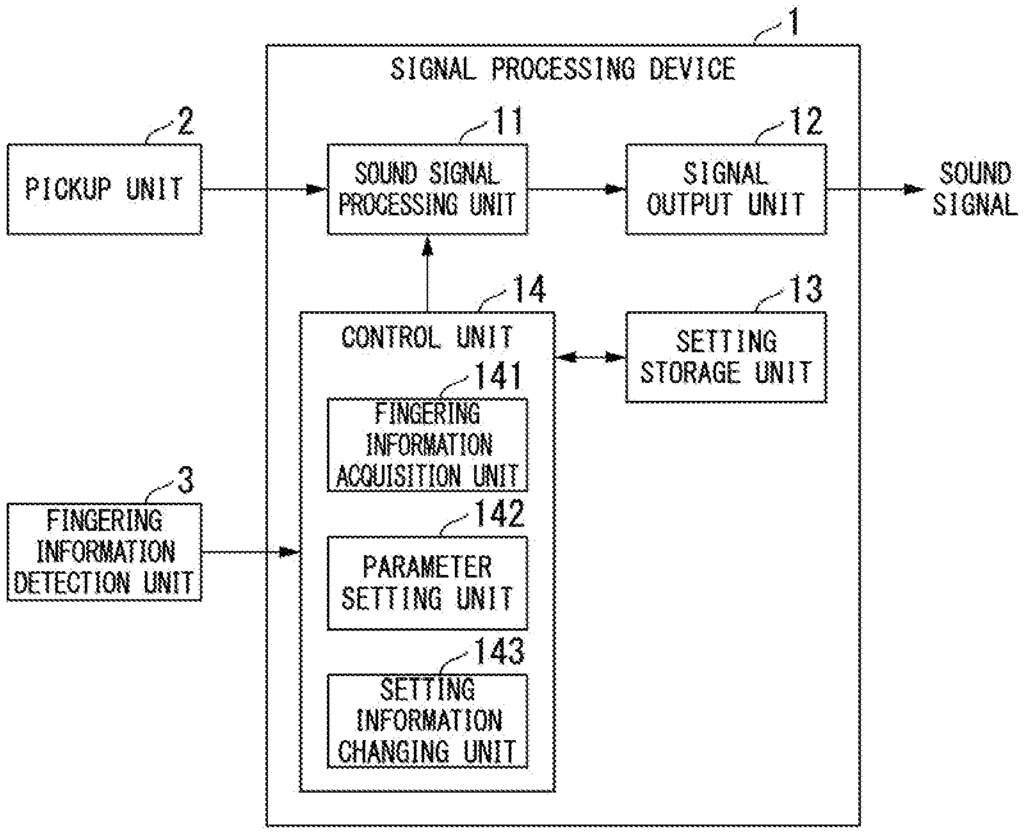
FIG. 1 is a block diagram showing an example of a signal processing device according to a first embodiment.

FIG. 1 is a block diagram showing an example of a signal processing device 1 according to a first embodiment of the present invention.

As shown in FIG. 1, the signal processing device 1 includes a sound signal processing unit 11, a signal output unit 12, a setting storage unit 13, and a control unit 14.

The signal processing device 1 executes sound signal processing by an equalizer on a sound signal indicating a sound obtained by playing a stringed instrument such as a guitar, and outputs the sound signal subjected to the sound signal processing. The signal processing device 1 is, for example, an audio device such as an effector. The signal processing device 1 may be provided inside the stringed instrument. The signal processing device 1 may be provided separately from the stringed instrument, that is, outside the stringed instrument. In this case, the signal processing device 1 may receive a signal from the stringed instrument or transmit a signal to the stringed instrument, for example, by wire or wirelessly.

In this embodiment, a case where the stringed instrument is a guitar will be described.

A pickup unit 2 converts vibrations of the guitar strings into a sound signal, and outputs the sound signal to the signal processing device 1 as a pickup signal. The pickup unit 2 is not limited to a method of detecting vibrations of guitar strings, and may be a method that collects sound by microphone.

A fingering information detection unit 3 detects the fingering information of the guitar. Fingering information is an example of information about a stringed instrument. The fingering information detection unit 3 detects the pressed string number (string number) and the pressed fret number (fret number) pressed by the performer's fingers as fingering information. The pressed string number indicates the number of the string pressed by the user's playing, and the pressed fret number indicates the number of the fret where the string has been pressed by the user's playing. The fingering information detection unit 3 outputs the detected fingering information to the signal processing device 1. The pressed string number and the pressed fret number also include the open fret state in which the string is not pressed.

For example, in order to detect fingering information, fret switches (switches) may be provided between the frets on the fingerboard of the guitar for each string. In this case, the fingering information detection unit 3 detects fingering information based on the on/off state of each fret switch. More specifically, the fret switch is turned on when the string comes into contact therewith by being pressed by the performer's finger. Also, the fret switch is turned off when the string separates from the fret switch. The fingering information detection unit 3 detects the string number and the fret number corresponding to the fret switch that is in the ON state as the pressed string number and the pressed fret number. As an example, Japanese Unexamined Patent Application, First Publication No. H02-162397 discloses a method of detecting a fret operation position by providing a fret switch. The method of detecting fingering information in the embodiment of the present invention is not limited to such an example. For example, the fingering information detection unit 3 may, at each fret position, use a photoreflector or the like to optically detect whether or not a string is in close proximity to the fret, and detect the fingering information on the basis of whether the string is in close proximity to the fret.

The sound signal processing unit (an example of the processing unit) 11 executes sound signal processing by an equalizer on an input sound signal on the basis of set parameters. The sound signal processing unit 11 functions as the equalizer. The sound signal processing unit 11 may for example acquire from the pickup unit 2 a pickup signal (sound signal) obtained by converting the vibrations of the guitar strings into a sound signal. Further, the sound signal processing unit 11 may execute on the acquired pickup signal sound signal processing by the equalizer based on the parameters, and output to the signal output unit 12 an output sound signal obtained by executing the sound signal processing on the pickup signal. The sound signal processing unit 11 includes, for example, a digital signal processor (DSP), and realizes the function of the equalizer through the digital signal processing of the DSP.

The sound signal processing unit 11 may perform sound signal processing on each pickup signal corresponding to each string of the guitar, or may perform sound signal processing on a pickup signal obtained by mixing the pickup signals corresponding to each string.

The signal output unit 12 (an example of an output unit) is, for example, a digital to analog converter (DAC), an output amplifier, and the like, and outputs the output sound signal obtained by sound signal processing being executed on the pickup signal by the sound signal processing unit 11.

The setting storage unit 13 stores information for a parameter setting unit 142, to be described later, to determine the equalizer parameters. The setting storage unit 13 stores setting information (setting table, setting function, etc.) that associates fingering information with the parameters.

A data example of the setting storage unit 13 will be described with reference to FIG. 2.

FIG. 2 is a diagram showing a data example of the setting storage unit 13 in the present embodiment.

As shown in FIG. 2, the setting storage unit 13 stores a frequency and level adjustment information in association with each other for each pressed string number and pressed fret number.

The pressed string number and pressed fret number are examples of the fingering information. The frequency indicates the frequency of the equalizer. Furthermore, the level adjustment information includes, for example, the gain of the equalizer and the Q value that determines the bandwidth in which the gain is set.

The example shown in FIG. 2 shows that the frequency of the fundamental tone is 330 Hz for the pressed string number being the first string and the pressed fret number being 0 (open), with the level adjustment information being G101 dB (gain) and width Q101 (Q value). Further, it is shown that the frequency of the second harmonic overtone is 660 Hz for the pressed string number being the first string and the pressed fret number being 0 (open), with the level adjustment information being G102 dB (gain) and width Q102 (Q value).

The example shown in FIG. 2 describes an example of setting three frequencies of a fundamental tone, a second harmonic, and a third harmonic corresponding to the pressed string number and the pressed fret number, and the level adjustment information, but the present embodiment is not limited thereto. A plurality of frequencies of the fourth harmonic and higher and level adjustment information may be set, or one frequency and level adjustment information may be set. When setting one frequency, the frequency of the fundamental tone, which is the fundamental frequency corresponding to the pressed string number and the pressed fret number, may be set.

Returning to the description of FIG. 1, the control unit 14 includes, for example, a fingering information acquisition unit 141, a parameter setting unit 142, and a setting information changing unit 143.

The fingering information acquisition unit 141 (an example of fingering information acquisition unit and an acquisition unit) acquires the fingering information of a guitar (stringed instrument). That is, the fingering information acquisition unit 141 acquires fingering information from the fingering information detection unit 3.

The parameter setting unit (example of the setting unit) 142 sets the equalizer parameters on the basis of the fingering information acquired by the fingering information acquisition unit 141. The parameter setting unit 142 sets the parameters based on, for example, setting information (a setting table) stored in the setting storage unit 13. That is, the parameter setting unit 142 acquires the parameters (frequency and level adjustment information) corresponding to the fingering information (pressed string number and pressed fret number) from the setting storage unit 13, and sets the acquired parameters (frequency and level adjustment information) in the sound signal processing unit 11.

In this way, the parameter setting unit 142 sets the frequency and level adjustment information corresponding to the fingering information as parameters.

In addition, the frequencies corresponding to the fingering information include the frequencies of the fundamental tone and overtones corresponding to the fingering information. In this case, the parameter setting unit 142 sets the frequencies of the fundamental tone and its overtones corresponding to the fingering information as parameters in accordance with the fingering information.

The fingering information includes a pressed string number indicating the string number used for fingering the guitar. The parameter setting unit 142 sets the parameters in correspondence with the fingering of each string on the basis of the pressed string number.

The setting information changing unit 143 writes or changes the setting information in the setting storage unit 13 based on an instruction from an external device (not shown). The setting information changing unit 143 stores the setting information acquired from the external device in the setting storage unit 13 based on an instruction from the external device, for example, when adjusting or customizing parameters in accordance with the characteristics of the guitar.

The operation of the signal processing device 1 according to the present embodiment will be described with reference to the drawings.

First, referring to FIG. 3, the parameter setting process of the signal processing device 1 according to the present embodiment will be described.

Figure 3:
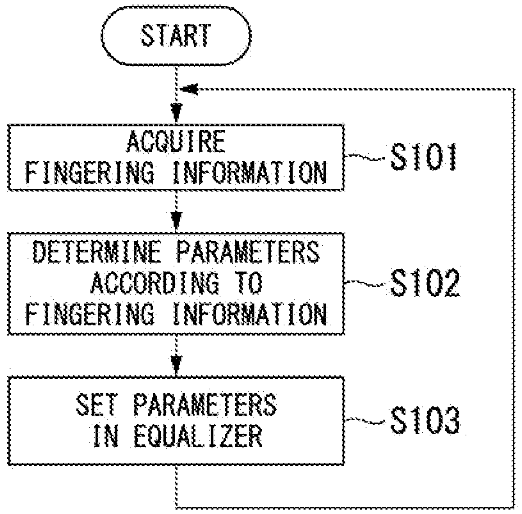
FIG. 3 is a flowchart showing an example of the parameter setting process in the first embodiment.

FIG. 3 is a flowchart showing an example of the parameter setting process in the present embodiment.

As shown in FIG. 3, in the parameter setting process, the control unit 14 of the signal processing device 1 first acquires the fingering information (Step S101). That is, the fingering information acquisition unit 141 of the control unit 14 acquires fingering information (for example, the pressed string number and pressed fret number) detected by the fingering information detection unit 3.

Next, the parameter setting unit 142 of the control unit 14 determines the parameters according to the fingering information (Step S102). For example, the parameter setting unit 142 acquires the frequency and level adjustment information corresponding to the pressed string number and pressed fret number, which are the fingering information, from the setting storage unit 13, and uses the frequency and level adjustment information as parameters.

Next, the parameter setting unit 142 sets the parameters in the equalizer (Step S103). That is, the parameter setting unit 142 sets the parameters in the sound signal processing unit 11 to change the characteristics of the sound signal processing. After the processing of Step S103, the parameter setting unit 142 returns the processing to Step S101.

In this way, in the parameter setting process of the signal processing device 1, the processes of steps S101 to S103 are periodically repeated. As a result, the equalizer parameters in the sound signal processing are changed according to the fingering of the guitar. In the present embodiment, for example, by changing a chord by fingering, it is possible to change the parameters of the sound signal processing (equalizer) before the pickup unit 2 picks up the vibrations of the strings.

Next, with reference to FIG. 4, the sound signal processing of the signal processing device 1 according to the present embodiment will be described.

Figure 4:
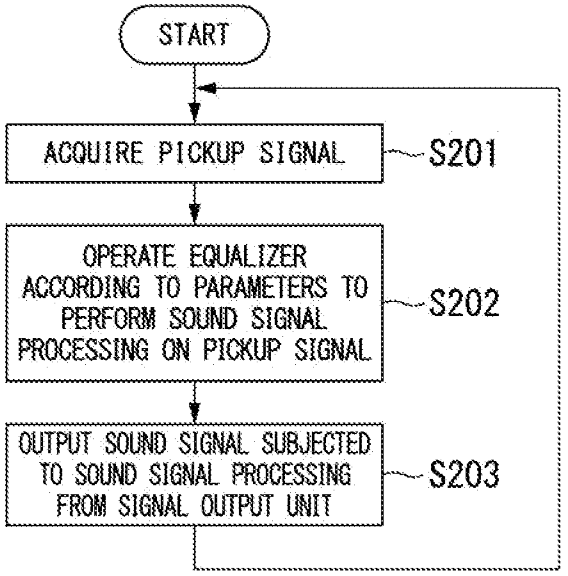
FIG. 4 is a flowchart showing an example of sound signal processing in the first embodiment.

FIG. 4 is a flowchart showing an example of sound signal processing in the present embodiment.

As shown in FIG. 4, when executing sound signal processing, the sound signal processing unit 11 of the signal processing device 1 first acquires a pickup signal (Step S201). That is, the sound signal processing unit 11 acquires the pickup signal (sound signal) input from the pickup unit 2.

Next, the sound signal processing unit 11 operates the equalizer according to the parameters to perform sound signal processing on the pickup signal (Step S202). That is, the sound signal processing unit 11 executes sound signal processing by the equalizer on the input sound signal on the basis of the parameters set by the parameter setting unit 142.

Next, the sound signal processing unit 11 causes the sound signal subjected to the sound signal processing to be output from the signal output unit 12 (Step S203). The sound signal processing unit 11 outputs the sound signal that has been subjected to the sound signal processing to the signal output unit 12. The signal output unit 12 then outputs the sound signal to the outside. After the processing in Step S203, the sound signal processing unit 11 returns the processing to Step S201.

In this way, the signal processing device 1 according to the present embodiment performs sound signal processing on the input pickup signal by the parameters changed in accordance with the fingering information, and outputs the sound signal subjected to the sound signal processing.

Next, an example of a specific operation of the signal processing device 1 according to the present embodiment will be described with reference to FIGS. 5 and 6.

Figure 5:
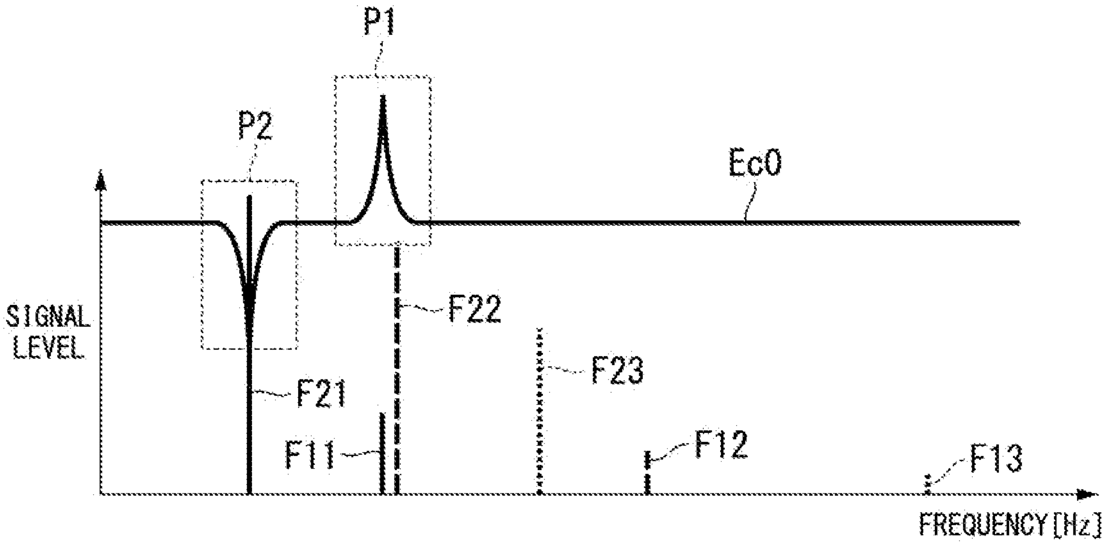
FIG. 5 is a diagram showing an example of the operation of the signal processing device according to the first embodiment.

FIG. 5 is a diagram showing an example of the operation of the signal processing device 1 according to the present embodiment.

In FIG. 5, the vertical axis of the graph indicates the signal level, and the horizontal axis indicates the frequency. The equalizer characteristic Ec0 indicates the frequency characteristic of the equalizer that has been set on the basis of the fingering information.

In the example shown in FIG. 5, for example, the first string and the second string are pressed. The frequency F11 indicates the frequency of the fundamental tone corresponding to the first string, the frequency F12 indicates the frequency of the second harmonic corresponding to the first string, and the frequency F13 indicates the frequency of the third harmonic corresponding to the first string. Further, the frequency F21 indicates the frequency of the fundamental tone corresponding to the second string, the frequency F22 indicates the frequency of the second harmonic corresponding to the second string, and the frequency F23 indicates the frequency of the third harmonic corresponding to the second string.

In the example shown in FIG. 5, the signal levels of the respective frequencies are presented as bar graphs. The signal level of the frequency of the fundamental tone is shown by a solid line, the signal level of the second harmonic frequency is shown by a broken line, and the signal level of the third harmonic frequency is shown by a dotted line.

The example shown in FIG. 5 is an example of performing sound signal processing that adjusts the signal level of the frequency of the fundamental tone corresponding to the fingering information. The parameter setting unit 142 for example performs a setting to amplify the signal level of the frequency F11 corresponding to the first string as shown in the parameter P1. Further, the parameter setting unit 142 for example performs a setting to reduce the signal level of the frequency F21 corresponding to the second string, as shown in the parameter P2.

In this case, the sound signal processing unit 11 executes sound signal processing on the pickup signal by operating the equalizer according to the frequency characteristic shown in the equalizer characteristic Ec0, and outputs the sound signal subjected to the sound signal processing to the outside via the signal output unit 12.

Figure 6:
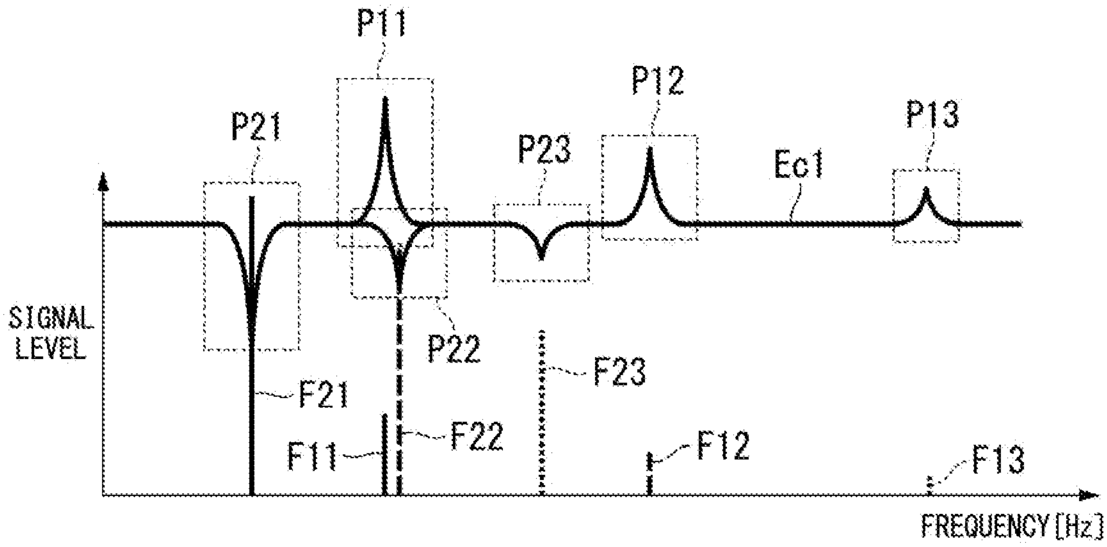
FIG. 6 is a diagram showing another example of the operation of the signal processing device according to the first embodiment.

FIG. 6 is a diagram showing another example of the operation of the signal processing device 1 according to the present embodiment.

The example shown in FIG. 6 is an example of performing sound signal processing for adjusting the signal levels of the fundamental tone, second harmonic and third harmonic frequencies corresponding to fingering information. As shown in the equalizer characteristic Ec1, the frequency characteristic of the equalizer set based on the fingering information is different from the above-mentioned example shown in FIG. 5. The other parts are the same as those in FIG. 5 described above.

In the example shown in FIG. 6, the parameter setting unit 142 for example performs a setting that amplifies the signal levels of the frequency F11 (fundamental tone), frequency F12 (second harmonic), and frequency F13 (third harmonic) corresponding to the first string as shown in the parameter P11, parameter P12, and parameter P13, respectively. Further, the parameter setting unit 142 for example performs a setting that reduces the signal levels of the frequency F21 (fundamental tone), frequency F22 (second harmonic), and frequency F23 (third harmonic) corresponding to the second string as shown in the parameter P21, parameter P22, and parameter P23, respectively.

In this case, the sound signal processing unit 11 executes sound signal processing on the pickup signal by operating the equalizer according to the frequency characteristic shown in the equalizer characteristic Ec1, and outputs the sound signal subjected to the sound signal processing to the outside via the signal output unit 12.

Next, with reference to FIGS. 7A and 7B, the operation of the signal processing device 1 according to the present embodiment in accordance with a change in the fingering information will be described.

Figure 7A:
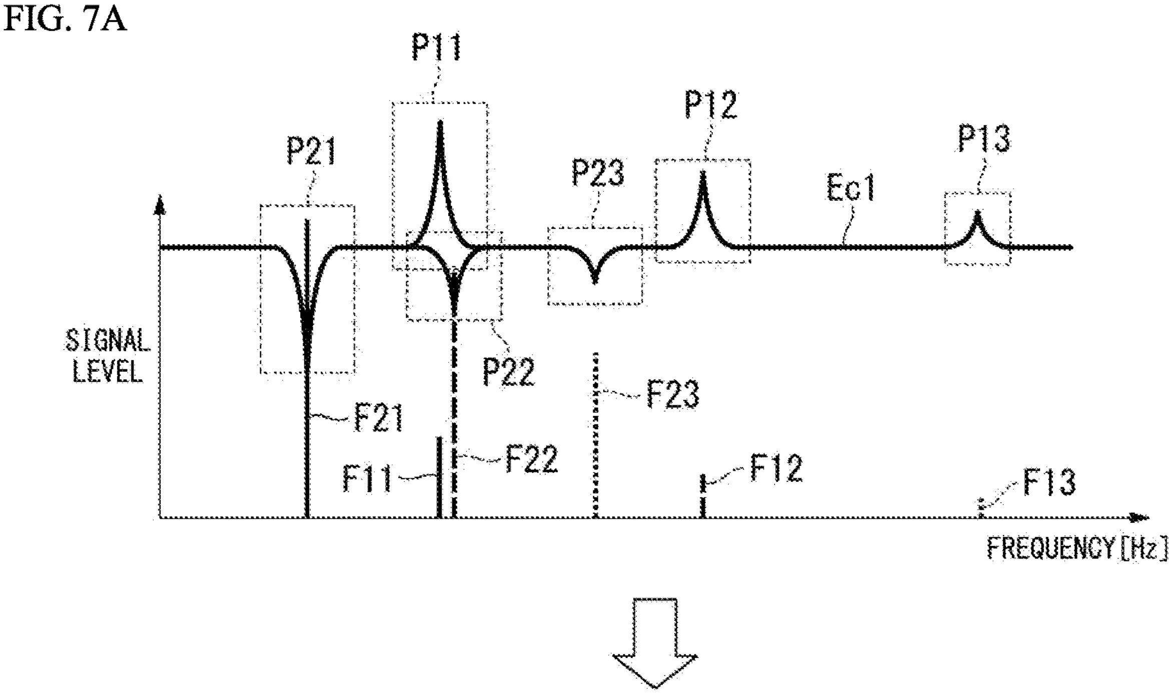
FIGS. 7A and 7B are diagrams showing an example of processing according to a change in fingering information by the signal processing device according to the first embodiment.
Figure 7B:
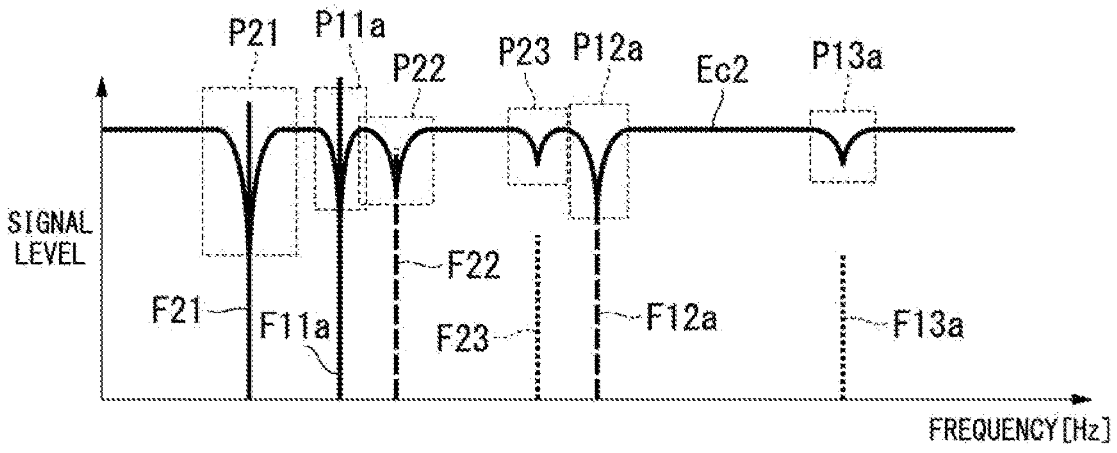

FIGS. 7A and 7B are diagrams illustrating a difference in the processing of the signal processing device 1 according to the present embodiment in accordance with a change in fingering information.

FIG. 7A shows the equalizer parameters that have been set for the fingering state c1 shown in FIG. 6 described above. FIG. 7B shows the equalizer parameters that have been set for the state after the fingering information of the first string has changed from the fingering state c1 to the fingering state c2.

By changing the pressing position of the first string to shift from the fingering state c1 to the fingering state c2, the parameter setting unit 142 changes the parameter settings of the equalizer from the frequency characteristic shown in the equalizer characteristic Ec1 in FIG. 7A to the frequency characteristic shown in the equalizer characteristic Ec2 of FIG. 7B. That is, the parameter setting unit 142 for example performs a setting that reduces the sound levels of the frequency F11*a* (fundamental tone), frequency F12*a* (second harmonic), and frequency F13*a* (third harmonic) corresponding to the pressed fret number of the first string fingering state c2 as shown in the parameter P11*a*, parameter P12*a*, and parameter P13*a*, respectively.

In this case, the sound signal processing unit 11 executes the sound signal processing on the pickup signal by operating the equalizer with the frequency characteristic changed from the equalizer characteristic Ec1 of the fingering state c1 to the equalizer characteristic Ec2 of the fingering state c2, and outputs the sound signal subjected to the sound signal processing to the signal output unit 12.

As described above, in the signal processing device 1 according to the present embodiment, in accordance with the fingering state, the equalizer parameter can be changed prior to pick-up (before making a sound), and the sound signal processing can be changed.

As described above, the signal processing device 1 according to the present embodiment includes a fingering information acquisition unit 141, a parameter setting unit 142, a sound signal processing unit 11, and a signal output unit 12. The fingering information acquisition unit 141 acquires fingering information of a guitar (stringed instrument). The parameter setting unit 142 sets the equalizer parameters on the basis of the fingering information acquired by the fingering information acquisition unit 141. The sound signal processing unit 11 executes sound signal processing by the equalizer on the input sound signal based on the parameters set by the parameter setting unit 142. The signal output unit 12 outputs an output sound signal which is the sound signal on which sound signal processing has been executed by the sound signal processing unit 11.

Thereby, since the signal processing device 1 according to the present embodiment can change the parameters according to the fingering information, the equalizer settings can be changed dynamically according to the performance.

Further, since the signal processing device 1 according to the present embodiment changes the parameters according to the fingering information, by changing the equalizer settings for each pitch of the stringed instrument corresponding to the fingering information, it is possible to reduce volume variations between pitches of the stringed instrument.

In the conventional signal processing device, it is necessary to set the equalizer prior to a performance, making it difficult to dynamically change the equalizer setting during the performance. In contrast, in the signal processing device 1 according to the present embodiment, the equalizer parameters can be changed according to the fingering information, so that it is possible to appropriately respond to, for example, various pitches and harmonies (chords).

Further, in the present embodiment, the parameters include the frequency and level adjustment information for adjusting the signal level of the sound signal corresponding to the frequency. The parameter setting unit 142 sets the frequency and level adjustment information corresponding to the fingering information as parameters. As the sound signal processing, the sound signal processing unit 11 adjusts the signal levels of the frequencies corresponding to the fingering information based on the level adjustment information.

Thereby, the signal processing device 1 according to the present embodiment can appropriately change the equalizer setting in accordance with the fingering information.

In the present embodiment, the frequencies corresponding to the fingering information include the frequencies of the fundamental tone and harmonics corresponding to the fingering information. The parameter setting unit 142 sets the frequencies of the fundamental tone and harmonics corresponding to the fingering information as parameters according to the fingering information.

Thereby, the signal processing device 1 according to the present embodiment can further appropriately change the equalizer settings in accordance with the fingering information.

Further, in the present embodiment, the fingering information includes pressed string numbers indicating each string number used in the fingering of the guitar (stringed instrument). The parameter setting unit 142 sets the parameters according to the fingering of each string based on the pressed string numbers. The pressed string number is an example of string number information.

As a result, the signal processing device 1 according to the present embodiment can change the equalizer settings according to the fingering of each string, so that the settings can be changed with a high degree of freedom.

The signal processing device 1 according to the present embodiment includes a setting storage unit 13 that stores setting information in which fingering information and parameters are associated with each other. The parameter setting unit 142 sets the parameters based on the setting information stored in the setting storage unit 13.

Thereby, the signal processing device 1 according to the present embodiment can appropriately change the equalizer setting according to the fingering information. For example, by changing the setting information stored in the setting storage unit 13, it is possible to easily perform adjustments for individual variations in the guitar (stringed instrument) and user customization.

Further, the signal processing method according to the present embodiment is a signal processing method of the signal processing device 1 including the sound signal processing unit 11 that executes sound signal processing by an equalizer and the signal output unit 12 that outputs an output sound signal which is a sound signal on which sound signal processing has been executed by the sound signal processing unit 11, and the fingering information acquisition unit 141 acquires fingering information of the guitar (fingering information acquisition step), the parameter setting unit 142 sets the equalizer parameters on the basis of the fingering information acquired by the fingering information acquisition unit 141 (parameter setting step), and the sound signal processing unit 11 executes sound signal processing by the equalizer on the input sound signal based on the parameters set by the parameter setting unit 142.

Thereby, the signal processing method according to the present embodiment has a similar advantageous effect to the signal processing device 1 described above, being able to dynamically change the equalizer settings according to the performance.

Second Embodiment

Next, a signal processing device 1*a* according to the second embodiment will be described with reference to the drawings.

In this embodiment will be described a modified example of changing the equalizer parameters in accordance with the signal level of a predetermined frequency of the sound signal.

Figure 8:
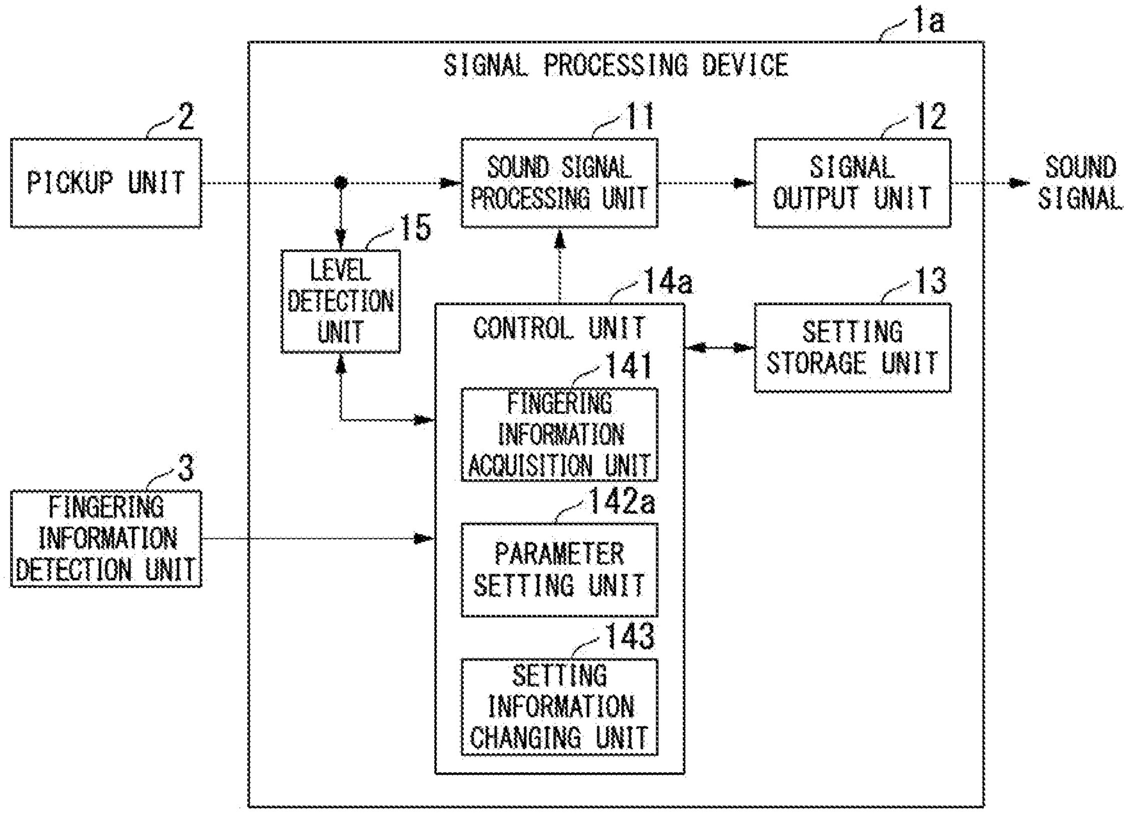
FIG. 8 is a block diagram showing an example of a signal processing device according to a second embodiment.

FIG. 8 is a block diagram showing an example of the signal processing device 1*a* according to the second embodiment.

As shown in FIG. 8, the signal processing device 1*a* includes a sound signal processing unit 11, a signal output unit 12, a setting storage unit 13, a control unit 14*a*, and a level detection unit 15. The signal processing device 1*a* may be provided inside the stringed instrument. The signal processing device 1*a* may be provided separately from the stringed instrument, that is, outside the stringed instrument. In this case, the signal processing device 1*a* may receive a signal from the stringed instrument or transmit a signal to the stringed instrument, for example, by wire or wirelessly.

Note that, in FIG. 8, the same reference numerals are given to the same configurations as those shown in FIG. 1, with the descriptions thereof being omitted. In the second embodiment, the signal processing device 1*a* includes with the level detection unit 15, and the processing by the control unit 14*a* differs from that of the first embodiment.

The level detection unit 15 detects the signal level (detection signal level) of a predetermined frequency of the sound signal. The level detection unit 15 detects, for example, the signal level of a frequency specified by the control unit 14*a* from the pickup signal output by the pickup unit 2. The level detection unit 15 detects the signal level of a designated frequency by using, for example, a bandpass filter, a fast Fourier transform (FFT) process, or the like.

The control unit 14*a* includes a fingering information acquisition unit 141, a parameter setting unit 142*a*, and a setting information changing unit 143.

The parameter setting unit 142*a* sets the equalizer parameters on the basis of the fingering information acquired by the fingering information acquisition unit 141. The parameter setting unit 142*a* sets the parameters according to the detection signal level detected by the level detection unit 15 and fingering information. The parameter setting unit 142*a* acquires, for example, parameters (frequency and level adjustment information) corresponding to the fingering information (pressed string number and pressed fret number) from the setting storage unit 13. The parameter setting unit 142*a* sets the acquired frequency in the level detection unit 15. The parameter setting unit 142*a* sets the parameters in the sound signal processing unit 11 according to the detection signal level of the frequency detected by the level detection unit 15.

For example, in the case of suppressing howling, when the signal level of a frequency detected by the level detection unit 15 is equal to or higher than a predetermined threshold value, the parameter setting unit 142*a* sets in the sound signal processing unit 11 level adjustment information for reducing the level of the sound signal of the frequency corresponding to the finger information, on the basis of the level adjustment information.

Thereby, the sound signal processing unit 11 executes sound signal processing with an equalizer to reduce the level of the sound signal of a frequency corresponding to the fingering information when the signal level of the frequency corresponding to the fingering information is equal to or higher than a predetermined threshold value.

Next, the operation of the signal processing device 1*a* according to the present embodiment will be described with reference to the drawings.

First, referring to FIG. 9, the parameter setting process of the signal processing device 1*a* according to the present embodiment will be described.

Figure 9:
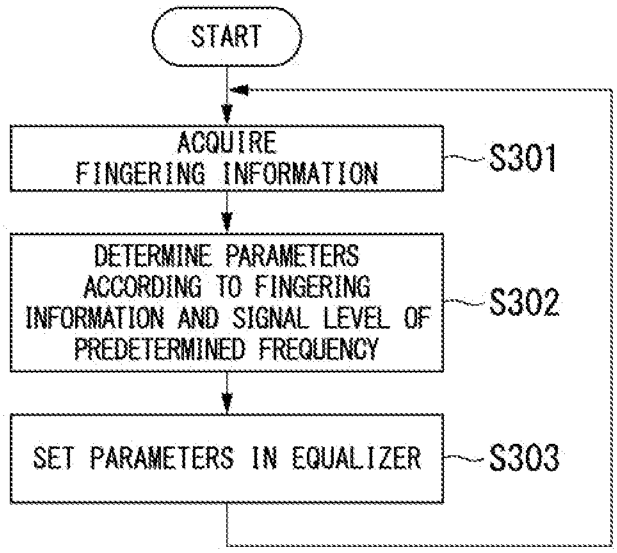
FIG. 9 is a flowchart showing an example of the parameter setting process in the second embodiment.

FIG. 9 is a flowchart showing an example of the parameter setting process in the present embodiment.

As shown in FIG. 9, in the parameter setting process, the control unit 14*a* of the signal processing device 1*a* first acquires fingering information (Step S301). That is, the fingering information acquisition unit 141 of the control unit 14*a* acquires the fingering information detected by the fingering information detection unit 3.

Next, the parameter setting unit 142*a* of the control unit 14*a* determines the parameters according to the fingering information and the signal level of a predetermined frequency (Step S302). The parameter setting unit 142*a* acquires, for example, frequency and level adjustment information corresponding to the pressed string number and pressed fret number, which are fingering information, from the setting storage unit 13, and acquires the detection signal level of the frequency corresponding to the fingering information detected by the level detection unit 15. For example, when the signal level of the frequency corresponding to the fingering information is equal to or higher than a predetermined threshold value, the parameter setting unit 142*a* uses the frequency and the level adjustment information as parameters.

Next, the parameter setting unit 142*a* sets the parameters in the equalizer (Step S303). That is, the parameter setting unit 142*a* sets the parameters in the sound signal processing unit 11 to change the characteristics of the sound signal processing. After the processing of Step S303, the parameter setting unit 142*a* returns the processing to Step S301.

Next, with reference to FIGS. 10A and 10B, the operation of the signal processing device 1*a* of the present embodiment in accordance with a change of the fingering information will be described.

Figure 10A:
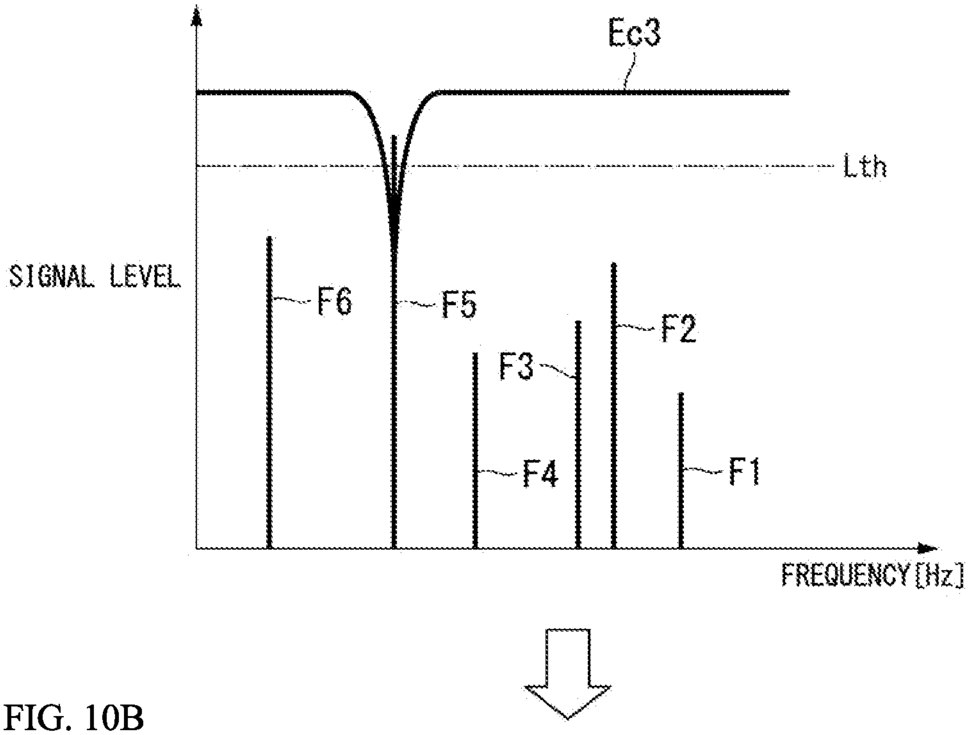
FIGS. 10A and 10B are diagrams showing an example of the operation of the signal processing device according to the second embodiment.
Figure 10B:
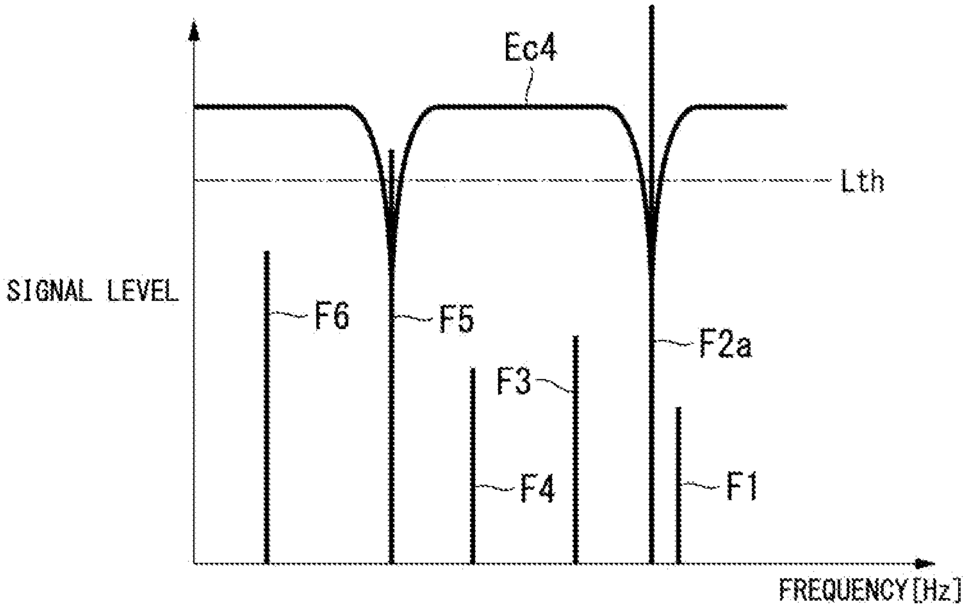

FIGS. 10A and 10B are diagrams showing an example of the operation of the signal processing device 1*a* according to the present embodiment.

FIG. 10A shows, for example, the signal level and frequency characteristic of the frequency (fundamental tone) corresponding to each of the 1st to 6th strings in the fingering state c3.

In FIG. 10A, the frequencies F1 to F6 indicate the frequencies corresponding to the 1st to 6th strings in the fingering state c3, respectively. The equalizer characteristic Ec3 indicates the frequency characteristic of the equalizer set on the basis of the fingering information in the fingering state c3.

In the example shown in FIG. 10A, the parameter setting unit 142*a* sets the parameters in the equalizer so that when the signal level of the frequency F5 corresponding to the fifth string becomes the predetermined threshold value Lth or more, the frequency characteristic is as shown by the equalizer characteristic Ec3. In this case, the parameter setting unit 142*a* performs a setting to reduce the signal level of the frequency F5 in order to prevent howling when the signal level of the frequency F5 has become equal to or higher than the predetermined threshold value Lth.

In this case, when the signal level of the frequency F5 is equal to or higher than the predetermined threshold Lth, the sound signal processing unit 11 executes the sound signal processing on the pickup signal by operating the equalizer according to the frequency characteristic shown in the equalizer characteristic Ec3, and outputs the output sound signal subjected to the sound signal processing to the outside via the signal output unit 12.

FIG. 10B shows, for example, the signal level and frequency characteristic of the frequency (fundamental tone) corresponding to each of the first to sixth strings after the fingering information of the second string has changed from the fingering state c3 to the fingering state c4.

In this case, in response to a change in the pressed fret number of the second string, the parameter setting unit 142*a* sets the equalizer parameters so as to have the frequency characteristic as shown in the equalizer characteristic Ec4, which adds to the equalizer characteristic Ec3 a parameter when the signal level of the frequency F2*a* corresponding to the pressed fret number of the second string becomes equal to or higher than the predetermined threshold value Lth. In this case, the parameter setting unit 142*a* performs a setting that reduces the signal level of the frequency F5 in order to prevent howling when the signal level of frequency F5 has become equal to or higher than the predetermined threshold value Lth, and performs a setting that reduces the signal level of the frequency F2*a* in order to prevent howling when the signal level of frequency F2*a* has become equal to or higher than the predetermined threshold value Lth.

In this case, the sound signal processing unit 11 executes the sound signal processing on the pickup signal by operating the equalizer according to the frequency characteristics changed from the equalizer characteristic Ec3 in the fingering state c3 to the equalizer characteristic Ec4 in the fingering state c4, and outputs the output sound signal subjected to the sound output processing to the outside via the signal output unit 12.

As described above, the signal processing device 1*a* according to the present embodiment includes the parameter setting unit 142*a*. When the signal level of a frequency corresponding to the fingering information is equal to or higher than a predetermined threshold value (for example, the threshold Lth or higher), the parameter setting unit 142*a* sets level adjustment information that lowers the level of the sound signal of the frequency corresponding to the fingering information.

Thereby, the signal processing device 1*a* according to the present embodiment can reduce howling of the sound signal.

In the signal processing device 1*a* according to the present embodiment, the parameter setting unit 142*a* performs a setting that reduces the signal level of a frequency that is subject to howling in order to reduce howling, and moreover changes the frequency that is subject to howling in accordance with the fingering information. Therefore, in the signal processing device 1*a* according to the present embodiment, the setting of the equalizer for howling countermeasures can be minimized. As a result, it is possible to reduce the change in timbre due to howling measures.

The signal processing device 1*a* according to the present embodiment establishes a threshold value for the signal level to which the howling countermeasure is applied. Therefore, when howling does not occur, the sound signal processing for reducing the signal level is not executed. As a result, the signal processing device 1*a* according to the present embodiment can further reduce the change in timbre due to howling countermeasures.

Further, the signal processing device 1*a* according to the present embodiment includes a level detection unit 15 that detects a signal level of a predetermined frequency of a sound signal. The parameter setting unit 142*a* sets the parameters according to the detection signal level detected by the level detection unit 15 and fingering information.

Thereby, the signal processing device 1*a* according to the present embodiment can further dynamically change the equalizer setting according to the performance.

In the above-described embodiment, an example is described in which the level detection unit 15 is provided outside the sound signal processing unit 11, and the parameter setting unit 142*a* changes the equalizer parameters according to the signal level of a predetermined frequency, but is not limited thereto. For example, the sound signal processing unit 11 may include the level detection unit 15 and switch whether or not to apply the set parameters according to the signal level of a predetermined frequency.

Further, in the present embodiment, the setting storage unit 13 may store the setting information that includes the threshold value of the signal level.

Third Embodiment

Next, as a third embodiment, a modified example in which the signal processing device 1 (1*a*) according to the first and second embodiments described above is provided in a stringed instrument will be described. Here, as an example of a stringed instrument, a form in which a guitar includes the signal processing device 1 (1*a*) will be described.

Figure 11:
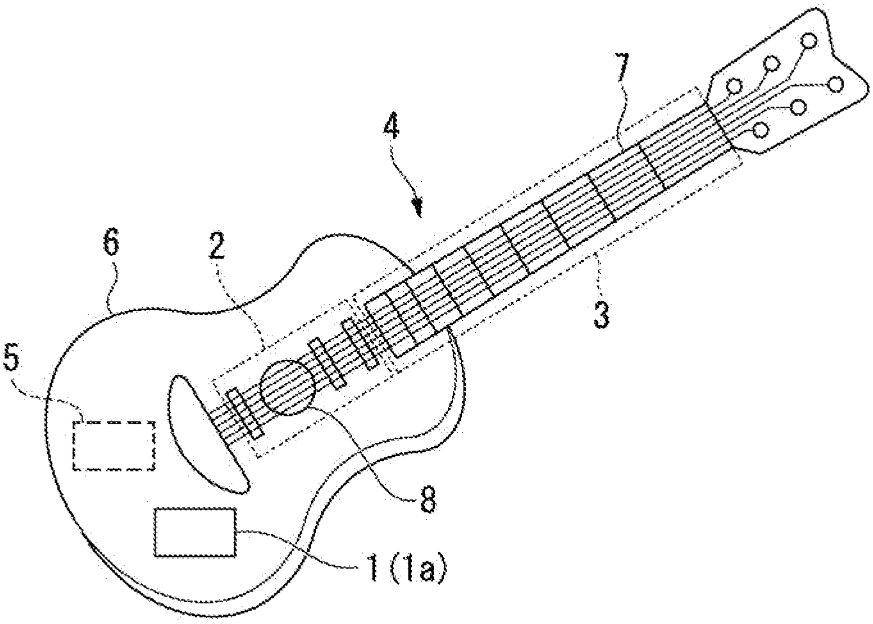
FIG. 11 is a configuration diagram showing an example of a stringed instrument according to a third embodiment.

FIG. 11 is a configuration diagram showing a guitar 4, which is an example of a stringed instrument according to the present embodiment.

As shown in FIG. 11, the guitar 4 includes a pickup unit 2, a fingering information detection unit 3, a signal processing device 1 (1*a*), a vibrator 5, a body 6, and a neck 7. The vibrator 5 is provided inside the body 6. The body 6 has a sound hole 8.

The fingering information detection unit 3 is for example arranged in the neck 7 of the guitar 4, detects the fingering information of each string, and outputs the fingering information of each string to the signal processing device 1 (1*a*).

The pickup unit 2 is arranged on the body 6 of the guitar 4. The pickup unit 2 converts the vibrations of the strings of the guitar 4 into a sound signal, and outputs the sound signal to the signal processing device 1 (1*a*) as a pickup signal.

In the guitar 4, the signal processing device 1 (1*a*) changes the equalizer parameters according to the fingering information detected by the fingering information detection unit 3, performs sound signal processing on a pickup signal output by the pickup unit 2 when the player plays the strings, and outputs the signal to the vibrator 5 (an example of outside).

The vibrator 5 applies vibrations to the body 6 according to the pick-up signal (sound signal) subjected to the sound signal processing. The volume (or timbre) emitted by the guitar 4 is changed by the vibration of the body 6 due to the vibrator 5.

As described above, the guitar 4 (stringed instrument) according to the present embodiment includes the fingering information detection unit 3 for detecting fingering information and the signal processing device 1 (1*a*) described above.

As a result, the guitar 4 (stringed instrument) according to the present embodiment exhibits a similar advantageous effect to the signal processing device 1 (1*a*) described above, and can dynamically change the equalizer setting according to the performance.

The present invention is not limited to each of the above embodiments, and can be modified without departing from the spirit of the present invention.

In each of the above embodiments, an example in which the signal processing device 1 (1*a*) is an audio device such as an effector has been described, but the embodiment is not limited to such an example. The signal processing device 1 (1*a*) may be, for example, an electronic device such as a smartphone, a tablet terminal device, or a personal computer (PC). Moreover, the signal processing device 1 (1*a*) may have a form in which the sound signal processing unit 11 and the signal output unit 12 are externally provided.

Further, in each of the above embodiments, as examples of a stringed instrument to which the signal processing device 1 (1*a*) is applied, a guitar and a guitar having a vibrator in the body have been described, but the embodiments of the present invention are not limited to such examples. For example, the signal processing device 1 (1*a*) may be applied to a guitar that emits sound from an external speaker, such as an electric-acoustic guitar, an electric guitar, or an electronic guitar. Further, the signal processing device 1 (1*a*) is not limited to various guitars, and may be applied to other musical instruments such as an acoustic bass, an electric bass, a violin and a cello. In that case, for musical instruments that do not have frets, a configuration may be provided for detecting whether or not the strings or fingers are in contact with the fingerboard. Further, the signal processing device 1 (1*a*) may detect pressed string position information indicating the position where the string is pressed instead of the pressed fret number as the fingering information. The signal processing device 1 (1*a*) may specify the pitch of the sound, that is, the frequency of the sound by using the pressed string position information, and perform the sound signal processing based on the specified frequency.

Further, although the above-mentioned first and second embodiments have been described as independent embodiments, the first and second embodiments may be implemented in a combined manner.

In the first embodiment described above, the example was described of the signal processing device 1 applying sound signal processing by the equalizer to the harmonics up to the third harmonic, but the sound signal processing by the equalizer may be applied to the harmonics of the fourth harmonic or higher.

Further, in the second embodiment, the signal processing device 1*a* may be made to set the frequency and level adjustment information of the fundamental tone and harmonics as in the first embodiment.

In each of the above embodiments, fingering information has been described as an example of information regarding a stringed instrument, but the embodiments of the present invention are not limited to such an example. The information relating to the stringed instrument may be vibration information relating to vibrations generated by the stringed instrument or pitch information relating to the pitches of the sounds emitted by the stringed instrument. As the vibration information, a signal indicating the vibrations of the strings detected by the pickup unit 2 may be used. As the pitch information, a signal indicating the pitches of the sounds emitted from the stringed instrument, being detected by a microphone (not shown), may be used. The parameter setting unit 142 (142*a*) may specify a frequency having a signal level equal to or higher than the threshold value by performing signal processing on the vibration information or pitch information. The parameter setting unit 142 may acquire parameters (level adjustment information) corresponding to the specified frequency from the setting storage unit 13, and set the acquired parameters in the equalizer (sound signal processing unit 11).

According to the disclosure of the present invention, the setting of an equalizer can be dynamically changed according to the performance.

Each configuration included in the above-described signal processing device 1 (1*a*) has a computer system inside. A program for realizing the functions of each configuration included in the signal processing device 1 (1*a*) is recorded on a computer-readable recording medium, and the process in each configuration included in the signal processing device 1 (1*a*) described above may be performed by reading the program recorded on the recording medium into a computer system and executing the program. Here, "a program recorded on a recording medium is read into a computer system and executed" includes installing the program in the computer system. The "computer system" here includes an operating system and hardware components such as peripheral devices.

Further, the "computer system" may include a plurality of computer devices connected via a network including a communication line such as the Internet, a WAN, a LAN, or a dedicated line. The "computer-readable recording medium" is, for example, a portable medium such as a flexible disk, a magneto-optical disk, a ROM, a CD-ROM or a storage device such as a hard disk embedded in the computer system. As described above, the recording medium storing the program may be a non-transitory recording medium such as a CD-ROM.

The recording medium also includes a recording medium provided internally or externally accessible from a distribution server for distributing the program. It should be noted that the program may be divided into a plurality of parts, which may each be downloaded at different timings and afterward combined by each configuration included in the signal processing device 1 (1*a*), or a plurality of different distribution servers may respectively distribute the divided parts of the program. Further, the "computer-readable recording medium" includes a medium which holds the program for a certain period of time, such as a volatile memory (RAM) inside the computer system which becomes a server or a client in a case where the program is transmitted via the network. The program may be one for realizing some of the functions described above. Furthermore, the program may be a so-called differential file (differential program) that can realize the above-mentioned functions in combination with a program that has already been recorded in the computer system.

Some or all of the functions of the above-described functions may be realized as an integrated circuit such as a large scale integration (LSI). Each of the above-described functions may be individually implemented as a processor, or some or all of the functions thereof may be integrated into a processor. The method of integration is not limited to LSI, and may be realized by a dedicated circuit or a general purpose processor. Furthermore, in the case where an integrated circuit technology to replace LSI appears due to advances in semiconductor technology, an integrated circuit based on such technology may be used.

The present invention may be applied to a signal processing device, a stringed instrument, a signal processing method, and a program.

What is claimed is:

1. A signal processing device comprising:
at least one memory configured to store instructions; and
at least one processor configured to execute the instructions to:
acquire information relating to a stringed instrument comprising fingering information relating to fingering of the stringed instrument;
detect a signal level of a sound signal at a frequency corresponding to the fingering information; and
set a parameter in an equalizer based on the acquired information relating to the stringed instrument and according to the detected signal level.

2. The signal processing device according to claim 1, further comprising:
the equalizer, wherein the equalizer is configured to execute sound signal processing on the sound signal to obtain an output sound signal,
wherein the at least one processor is configured to execute the instructions to output the obtained output sound signal.

3. The signal processing device according to claim 2,
wherein the at least one processor is configured to execute the instructions to set the parameter in the equalizer by setting, in the equalizer, level adjustment information for adjusting a signal level of the sound signal at at least one frequency corresponding to the fingering information, and
wherein the sound signal processing comprises adjusting the signal level of the sound signal at the at least one frequency based on the level adjustment information.

4. The signal processing device according to claim 3, wherein setting the level adjustment information comprises setting, in the equalizer, information for lowering the signal level of the sound signal at the at least one frequency when the signal level of the sound signal at the at least one frequency is equal to or higher than a predetermined threshold value.

5. The signal processing device according to claim 3,
wherein the at least one frequency comprises frequencies of a fundamental tone and a harmonic corresponding to the fingering information, and
wherein setting the level adjustment information comprises setting, in the equalizer, the level adjustment information for adjusting at least one signal level of the sound signal at the frequencies of the fundamental tone and the harmonic.

6. The signal processing device according to claim 1,
wherein the fingering information comprises string number information indicating a string number used for the fingering of the stringed instrument, and
wherein the at least one processor is configured to execute the instructions to set the parameter in the equalizer in correspondence with fingering of each string of the stringed instrument, based on the string number information.

7. The signal processing device according to claim 1, further comprising:
storage configured to store setting information that associates the fingering information with the parameter,
wherein the at least one processor is configured to execute the instructions to set the parameter to the equalizer also based on the setting information.

8. The signal processing device according to claim 1, wherein the information relating to the stringed instrument comprises vibration information relating to a vibration generated by the stringed instrument or pitch information relating to a pitch of a sound emitted by the stringed instrument.

9. A stringed instrument comprising:
the signal processing device according to claim 1; and
a detector configured to detect the fingering information.

10. A signal processing method for a signal processing device, the signal processing method comprising:
acquiring information relating to a stringed instrument comprising fingering information relating to fingering of the stringed instrument;
detecting a signal level of a sound signal of a frequency corresponding to the fingering information; and
setting a parameter in an equalizer based on the acquired information relating to the stringed instrument and according to the detected signal level.

11. A signal processing device comprising:
at least one memory configured to store instructions;
storage configured to store setting information that associates fingering information with a parameter; and
at least one processor configured to execute the instructions to:
acquire information relating to a stringed instrument comprising the fingering information relating to fingering of the stringed instrument; and
set a parameter in an equalizer based on the acquired information relating to the stringed instrument and based on the setting information.

12. The signal processing device according to claim 11, further comprising:
the equalizer, wherein the equalizer is configured to execute sound signal processing on the sound signal to obtain an output sound signal,
wherein the at least one processor is configured to execute the instructions to output the obtained output sound signal.

13. The signal processing device according to claim 12, wherein the at least one processor is configured to execute the instructions to set the parameter in the equalizer by setting, in the equalizer, level adjustment information for adjusting a signal level of the sound signal at at least one frequency corresponding to the fingering information, and wherein the sound signal processing comprises adjusting the signal level of the sound signal at the at least one frequency based on the level adjustment information.

14. The signal processing device according to claim 13, wherein setting the level adjustment information comprises setting, in the equalizer, information for lowering the signal level of the sound signal at the at least one frequency when the signal level of the sound signal at the at least one frequency is equal to or higher than a predetermined threshold value.

15. The signal processing device according to claim 13, wherein the at least one frequency comprises frequencies of a fundamental tone and a harmonic corresponding to the fingering information, and wherein setting the level adjustment information comprises setting, in the equalizer, the level adjustment information for adjusting at least one signal level of the sound signal at the frequencies of the fundamental tone and the harmonic.

16. The signal processing device according to claim 11, wherein the fingering information comprises string number information indicating a string number used for the fingering of the stringed instrument, and wherein the at least one processor is configured to execute the instructions to set the parameter in the equalizer in correspondence with fingering of each string of the stringed instrument, based on the string number information.

17. The signal processing device according to claim 11, wherein the information relating to the stringed instrument comprises vibration information relating to a vibration generated by the stringed instrument or pitch information relating to a pitch of a sound emitted by the stringed instrument.

18. A stringed instrument comprising:

the signal processing device according to claim 14; and a detector configured to detect the fingering information.

19. A signal processing method for a signal processing device, the signal processing method comprising:

acquiring information relating to a stringed instrument comprising fingering information relating to fingering of the stringed instrument;

storing setting information that associates the fingering information with a parameter; and setting a parameter in an equalizer based on the acquired information relating to the stringed instrument and based on the setting information.

* * * * *